United States Patent
Luckhardt et al.

(10) Patent No.: US 10,177,931 B2
(45) Date of Patent: Jan. 8, 2019

(54) METHOD FOR DATA COMMUNICATION WITH A DOMESTIC APPLIANCE BY A MOBILE COMPUTER DEVICE, MOBILE COMPUTER DEVICE AND DOMESTIC APPLIANCE

(71) Applicant: Electrolux Appliances Aktiebolag, Stockholm (SE)

(72) Inventors: Christoph Luckhardt, Rothenburg ob der Tauber (DE); Fabienne Reinhard-Herrscher, Rothenburg ob der Tauber (DE); Kersten Kaiser, Rothenburg ob der Tauber (DE); Christoph Walther, Rothenburg ob der Tauber (DE); Daniel Arler, Stockholm (SE); Sandro Comuzzi, Brussels (BE)

(73) Assignee: Electrolux Appliances Aktibolaget, Stockholm (SE)

( * ) Notice: Subject to any disclaimer, the term of this patent is extended or adjusted under 35 U.S.C. 154(b) by 0 days.

(21) Appl. No.: 15/329,334

(22) PCT Filed: Aug. 27, 2015

(86) PCT No.: PCT/EP2015/069641
§ 371 (c)(1),
(2) Date: Jan. 26, 2017

(87) PCT Pub. No.: WO2016/034486
PCT Pub. Date: Mar. 10, 2016

(65) Prior Publication Data
US 2017/0222825 A1    Aug. 3, 2017

(30) Foreign Application Priority Data
Sep. 3, 2014  (EP) .................................... 14183303

(51) Int. Cl.
*G08C 19/16* (2006.01)
*H04L 12/28* (2006.01)
(Continued)

(52) U.S. Cl.
CPC .......... *H04L 12/2807* (2013.01); *F24C 7/085* (2013.01); *F24C 7/087* (2013.01);
(Continued)

(58) Field of Classification Search
CPC ....... H05B 6/6435; H05B 6/668; G06F 15/16; G06F 17/30
See application file for complete search history.

(56) References Cited

U.S. PATENT DOCUMENTS 8,799,989 B1   8/2014 Liu
2012/0003364 A1  1/2012 Kling et al.
(Continued)

FOREIGN PATENT DOCUMENTS

DE   10 2007 048834 A1   4/2008
DE   10 2008 042804 A1   4/2009
(Continued)

OTHER PUBLICATIONS

International Search Report and Written Opinion from Corresponding Application No. PCT/EP2015/069541; dated Nov. 4, 2015.

*Primary Examiner* — Omeed Alizada
(74) *Attorney, Agent, or Firm* — Pearne & Gordon LLP

(57) ABSTRACT

A method for data communication with a domestic appliance by a mobile computer device. The domestic appliance and the mobile computer device are interconnected or interconnectable via a wireless data connection. The wireless data connection is adapted for transferring signals between the domestic appliance and the mobile computer device. Further, the present invention relates to application software for the mobile computer device. Moreover, the present inven-
(Continued)

Figure 1:
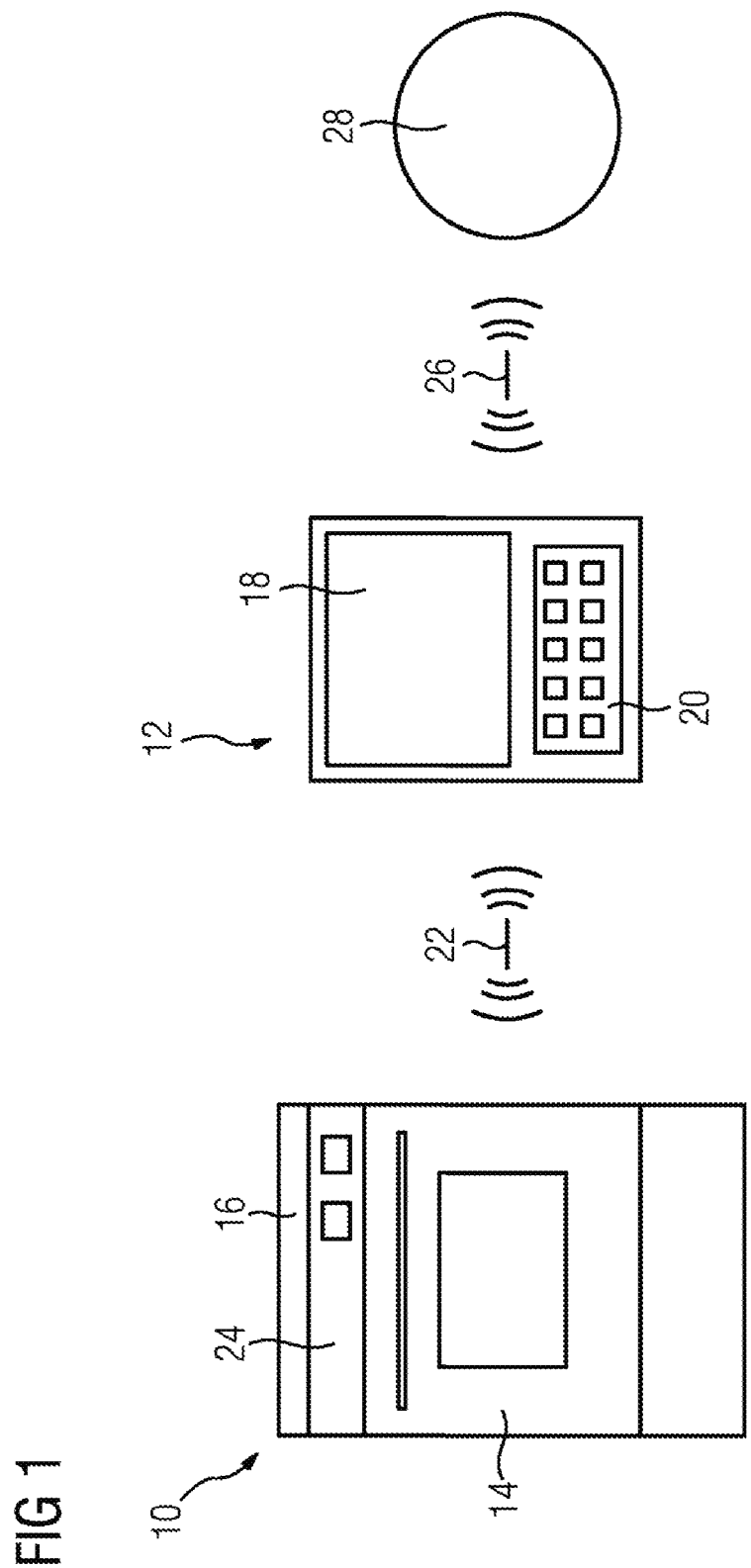

tion relates to a domestic appliance. Additionally, the present invention relates to a mobile computer device including a display or touch screen.

35 Claims, 7 Drawing Sheets

(51) Int. Cl.
| | |
|---|---|
| F24C 7/08 | (2006.01) |
| F24C 15/02 | (2006.01) |
| G08C 17/02 | (2006.01) |
| H04Q 9/00 | (2006.01) |
| H04L 12/64 | (2006.01) |
| H04W 76/10 | (2018.01) |
| G05B 19/042 | (2006.01) |
| H04L 29/06 | (2006.01) |
| H04N 5/232 | (2006.01) |
| H04N 7/18 | (2006.01) |
| H04W 84/12 | (2009.01) |
| G06F 17/30 | (2006.01) |
| H04W 52/02 | (2009.01) |

(52) U.S. Cl.
CPC .......... *F24C 15/023* (2013.01); *F24C 15/024* (2013.01); *G05B 19/042* (2013.01); *G08C 17/02* (2013.01); *H04L 12/282* (2013.01); *H04L 12/2803* (2013.01); *H04L 12/2816* (2013.01); *H04L 12/2834* (2013.01); *H04L 12/6418* (2013.01); *H04L 65/4084* (2013.01); *H04L 65/602* (2013.01); *H04N 5/23241* (2013.01); *H04N 5/23293* (2013.01); *H04N 7/183* (2013.01); *H04Q 9/00* (2013.01); *H04W 76/10* (2018.02); *G05B 2219/2613* (2013.01); *G05B 2219/2628* (2013.01); *G05B 2219/2643* (2013.01); *G06F 17/30979* (2013.01); *G08C 2201/93* (2013.01); *H04L 2012/285* (2013.01); *H04L 2012/2841* (2013.01); *H04M 2250/22* (2013.01); *H04Q 2209/40* (2013.01); *H04Q 2209/43* (2013.01); *H04Q 2209/80* (2013.01); *H04Q 2209/84* (2013.01); *H04W 52/0235* (2013.01); *H04W 84/12* (2013.01); *Y02D 70/142* (2018.01)

(56) References Cited

U.S. PATENT DOCUMENTS

| | | |
|---|---|---|
| 2013/0176116 A1 | 7/2013 | Jung et al. |
| 2014/0295822 A1* | 10/2014 | Koo .................. G06Q 20/3278 455/420 |
| 2015/0074237 A1 | 3/2015 | Unagami et al. |

FOREIGN PATENT DOCUMENTS

| | | |
|---|---|---|
| DE | 10 2013 226362 A1 | 6/2015 |
| EP | 2 647 916 A1 | 10/2013 |
| JP | 2004 157877 A | 6/2004 |
| WO | 2013/096136 A1 | 6/2013 |
| WO | 213/128532 A1 | 9/2013 |

* cited by examiner

METHOD FOR DATA COMMUNICATION WITH A DOMESTIC APPLIANCE BY A MOBILE COMPUTER DEVICE, MOBILE COMPUTER DEVICE AND DOMESTIC APPLIANCE

The present invention relates to a method for data communication with a domestic appliance by a computer device. Further, the present invention relates to application software for a computer device connected or connectable to a domestic appliance, in particular a cooking appliance including a cooking oven and/or a cooking hob. Moreover, the present invention relates to a domestic appliance, in particular a cooking appliance including a cooking oven with an oven cavity and/or a cooking hob, connected or connectable to a computer device. Additionally, the present invention relates to a computer device connected or connectable to a domestic appliance, in particular a cooking appliance including a cooking oven and/or a cooking hob.

Modern domestic appliances can be connectable to a communication network and/or to a computer device. Said communication network may be the internet or an internal network. These connections of the domestic appliances allow additional options for operating the domestic appliance. For example, the domestic appliances may be controlled by the computer device and/or via the communication network. Additional information provided by the communication network may be used for operating the domestic appliance. In many cases, information from the communication network is up to date.

For the data communication, it can be advantageous or even necessary, that the usability is flexible and/or effectively, so that it can be operated and/or controlled from different locations, for example.

It is an object of the present invention to provide an improved method for data communication with a domestic appliance by a computer device. Especially, it is an object of the present invention to improve the features and/or the usability and/or the effectivity of the data communication.

The object is achieved by the method according to claim 1.

The present invention relates to a method for data communication with a domestic appliance by a mobile computer device, wherein the domestic appliance and the mobile computer device are interconnected or interconnectable via a wireless data connection that is adapted for transferring signals between the domestic appliance and the mobile computer device.

The wireless data connection that is adapted for transferring signals between the domestic appliance and a mobile computer device allows a very flexible and effective use of the data communication with the domestic appliance by a mobile computer device. In particular when the domestic appliance is a cooking appliance, for example a cooking oven with an oven cavity and/or a cooking hob, it is very helpful if it is possible to control the domestic appliance by a wireless data connection which can be operated near the domestic appliance by the mobile computer device. For example, the mobile computer device may be a mobile phone, a smart phone, a tablet personal computer, a netbook or a notebook.

In some preferred embodiments, the first mobile computer device is interconnected or interconnectable via a second data connection with a first stationary computer. The first stationary computer can especially be a data server. The second data connection to the first stationary computer can preferably use an internet connection.

Preferably, the mobile computer device is interconnected or interconnectable with a second stationary computer, wherein the second stationary computer is especially a license server.

The mobile computer device can, in some embodiments, send a request with request data, especially user identification data and/or access permission data, to the second stationary computer in order to receive configuration data for establishing the connection with the first stationary computer.

The configuration data is, as a preferred option, submitted from the second stationary computer when the request data can be identified as valid request data by data on the storage system of the second stationary computer.

In a possible first request state, the mobile computer device can have valid request data on its storage system for the request so that the request data can be identified as valid request data by data on the second stationary computer.

In a possible second request state, the mobile computer device preferably has no valid request data on its storage system for the request so that the request cannot be identified as valid request data by data on the second stationary computer. As a further option, the second stationary computer can especially be a license server.

Preferably, in a first interacting state no data interaction with the first stationary computer is enabled. More preferably, in a second interacting state interaction with the first stationary computer is enabled.

In the first request state, the mobile computer device can transmit user identification data to the second stationary computer. As a further option, the second stationary computer can transmit configuration data for establishing the connection with the first stationary computer, so that the mobile computer device is switched from the first interacting state to the second interacting state with the first stationary computer.

In some embodiments, in the second request state the mobile computer device requests data input, especially registration information from the user, from an input device.

As a preferred next step, data input, especially registration information, is inputted by the user into the mobile computer device. The registration information from the user can optionally be transmitted to the second stationary computer by the mobile computer device.

In some embodiments, the second stationary computer transmits configuration data for establishing the connection with the first stationary computer, so that the mobile computer device is switched from the first interacting state to the second interacting state with the first stationary computer.

In a third interacting state extended interaction with the first stationary computer can preferably be enabled. More preferably, in the third interacting state, extended rights, especially extended warranties, can be permitted by the first stationary computer.

In some embodiments, items can be selected from a list, especially from a recipe list, wherein the recipe list is displayed on the display of the mobile computer device.

In the second interacting state, the mobile computer device can optionally transfer a first data packet with the selected items as well as second data packet with the information about the appliance to the first stationary computer.

The first stationary computer, especially a web shop, can, as a further option, provide a third data packet, preferably a list of products, more preferably of compatible and preferred products.

Preferably, the mobile computer device can transfer a fourth data packet to the first stationary computer, especially with order information for the selected items, to the second stationary computer.

In the second interacting state, it is advantageous if the mobile computer device can transfer appliance information to the first stationary computer.

In the first interacting state the mobile computer device can according to some embodiments transfer a data packet with a support request to the first stationary computer.

Preferably, the first stationary computer provides support and/or error handling information.

In the second interacting state the mobile computer device can optionally transfer appliance information to the first stationary computer.

In the second interacting state the mobile computer device can especially transfer a data packet with support request to the first stationary computer.

The first server can, in further embodiments, retrieve timing information for technicians from a database.

Preferably, the first stationary computer selects possible service times. More preferably, the first stationary computer provides timing information for booking a technician.

In the second interacting state, the mobile computer device can, in some embodiments, transfer a cooking class request to the first stationary computer.

Preferably, the third server retrieves timing information for cooking class from a database. The third stationary computer can select possible cooking class times, wherein the third server provides timing information for booking a cooking classes.

In the second interacting state, it is an option that the mobile is computer device can transfer a message and/or an image or a video sequence to the first stationary computer.

The third server can preferably saves the message and/or the image or the video sequence in a database, wherein the third server transfers the message and/or the image or the video sequence to a client computer.

Preferably, the method comprises the steps of:
detecting visually at least one object being treated by the domestic appliance,
generating a picture signal of the object being treated by the domestic appliance,
transferring the picture signal from the domestic appliance to the mobile computer device via the wireless connection, and
displaying a picture of the object being treated by the domestic appliance on a display or touch screen of the mobile computer device on the basis of the picture signal Therefore, the object being treated by the domestic appliance can especially represented or representable in real-time on the display or touch screen of the mobile computer device.

The wireless data connection between the domestic appliance and the mobile computer device can provide a representation of the object in real-time. The real-time representation of the object being treated by the domestic appliance on the display of the mobile computer device provides information about the actual state of said object from a distance.

According to a preferred embodiment, the domestic appliance is a cooking appliance including a cooking oven and/or a cooking hob, said object being treated by the domestic appliance is a food is stuff being treated by the cooking appliance, in particular a food stuff being treated in an oven cavity of a cooking oven, and said wireless data connection is at least a unidirectional data connection for transferring signals form the cooking appliance to the mobile computer device for allowing monitoring in real time by a user of the visual appearance of said food stuff being treated by the cooking appliance on the display or touchscreen of said mobile computer device.

Preferably, at least one current operating parameter of the domestic appliance is transferred between the domestic appliance and the mobile computer device via the wireless data connection, in particular wherein said at least one current operating parameter of the domestic appliance is indicated by the display or touch screen of the mobile computer device and/or wherein said at least one current operating parameter of the domestic appliance can be set by a user via said display or touch screen of the mobile computer device. The indication of current operating parameters increases the user's level of information.

In particular, the at least one current operating parameter of the domestic appliance is represented by a numerical value and/or by one or more graphical symbols on the display or touch screen of the mobile computer device. For example, the graphical symbols may represent numerical values by different sizes of an area or by the characteristic colours.

According to one embodiment, the domestic appliance is a cooking appliance, wherein the temperature of at least one food stuff being treated by the cooking appliance is detected by said cooking appliance, at least one corresponding temperature signal is transferred to the mobile computer device via the wireless data connection in real-time, and at least one corresponding temperature value is indicated by the mobile computer device. The view is of the food stuff and the knowledge of the temperature provide broad information of the cooking process.

Further, the domestic appliance is a cooking appliance, wherein an elapsed cooking time and/or a remaining cooking time of at least one food stuff being treated by the cooking appliance is transferred to the mobile computer device via the wireless data connection in real-time and indicated by the mobile computer device.

Additionally, the at least one operating parameter of the domestic appliance, preferably at least one current parameter of the domestic appliance, is evaluated by the mobile computer device and the obtained result is indicated on the display or touch screen of the mobile computer device, wherein said result includes a history and/or a statistical analysis of said at least one operating parameter of the domestic appliance and/or further corresponding information relating to said history and/or statistical analysis.

Optionally, the mobile computer device is connected or connectable to the internet via a wireless data connection, in particular via a wireless data local area network ("WLAN") and/or a mobile communications network, wherein the mobile computer device is connected or connectable to at least one social network and/or to at least one data base. The connection of the domestic appliance to the internet allows additional options for operating said domestic appliance.

According to a further embodiment, the wireless data connection between the domestic appliance and the mobile computer device is a bidirectional connection transferring signals between the domestic appliance and the mobile computer device, wherein the domestic appliance is controlled or controllable by the user via is the mobile computer device. The wireless bidirectional connection between the domestic appliance and the mobile computer device allows a remote control of said domestic appliance.

The present invention relates further to application software for a mobile computer device connected or connectable to a domestic appliance, in particular a cooking appliance including a cooking oven and/or a cooking hob, wherein the application software is provided for performing the method mentioned above. The use of application software allows a plurality of additional features by low complexity.

According to one example, the application software provides a recipe generator for a cooking appliance, wherein a user may input or select one or more search criteria for a cooking recipe and the recipe generator provides at least one corresponding proposal for a cooking recipe, and wherein a plurality of cooking recipes are stored in a memory of the mobile computer device and/or in a data base of the internet.

Optionally, said one or more search criteria for a cooking recipe are selectable by the user from a group comprising at least one recipe food ingredient type, at least one recipe food ingredient amount, at least one cooking or baking temperature, at least one cooking or baking duration and/or at least one generic cooking mode such as radiation cooking, forced convection cooking, steam cooking, microwave cooking or induction cooking, and the application software comprises at least one algorithm for selecting said at least one corresponding proposal for a cooking recipe from said plurality of stored recipes on the basis of said selection by the user of at least one of said search criteria for a cooking recipe.

Moreover, the application software may comprise an algorithm for is adapting at least one recipe parameter of at least one of said plurality stored cooking recipes to an operational feature of the cooking appliance.

In this case, said recipe parameter may be at least one of said recipe food ingredient amount, cooking or baking temperature, cooking or baking duration, and/or generic cooking mode and/or wherein said operational feature of the cooking appliance is a volume of an oven cavity of the cooking appliance, a calorific output of at least one heating element of the cooking appliance and/or a calorific output of a cooking mode of the cooking appliance such as a mode of the cooking appliance for radiation cooking, for forced convection cooking, for steam cooking, for microwave cooking or for induction cooking.

Further, the application software may comprise an algorithm for adapting at least one operational parameter of the cooking appliance according to said at least one recipe parameter of the cooking recipe that has been selected by the user from said proposal by said recipe generator for a cooking recipe, in particular wherein said at least one operational parameter of the cooking appliance is a cooking or baking temperature, a cooking or baking duration and/or a mode of the cooking appliance for radiation cooking, for forced convection cooking, for steam cooking, for microwave cooking or for induction cooking.

According to another example, the application software provides a multi-timer function for two or more dishes and/or courses in or on the cooking appliance, wherein said dishes and/or courses can be treated together at the same temperature by the cooking appliance, in particular together in the same oven cavity at the same temperature, but can require different cooking durations, and wherein the elapsed and/or remaining cooking durations of individual dishes and/or courses are indicated by the display or touch screen of the mobile computer device.

According to a further example, the application software provides a cooking time reduction function and/or a cooking temperature reduction function, wherein a user may reduce the cooking time and/or the cooking temperature of the cooking appliance by the mobile computer device via the wireless bidirectional data connection between the domestic appliance and the mobile computer device. In this case, the user can reduce the cooking time and/or the cooking temperature, but not increase said cooking time and/or the cooking temperature, respectively. This contributes to the safety of the cooking process.

Further, the present invention relates to a domestic appliance, in particular a cooking appliance including a cooking oven with an oven cavity and/or a cooking hob, connected or connectable to a mobile computer device via a wireless connection, wherein the domestic appliance is provided for the aforesaid method.

The domestic appliance comprises preferably at least one camera, in particular a camera arranged to detect visually and to provide a picture signal of said food stuff being treated by said cooking appliance in said oven cavity or on said coking hob.

Moreover, the present invention relates to a mobile computer device connected or connectable to a domestic appliance, in particular a cooking appliance including a cooking oven and/or a cooking hob, via a wireless data connection, wherein the mobile computer device comprises at least one display and/or touch screen, wherein the mobile computer device is provided for the method mentioned above and/or the mobile computer device supports aforesaid application software.

At last, the present invention relates to a computer program stored in a computer usable medium, comprising computer readable program means for causing a computer to perform the method mentioned above, wherein the computer program includes aforesaid application software.

Novel and inventive features of the present invention are set forth in the appended claims.

Figure 2:
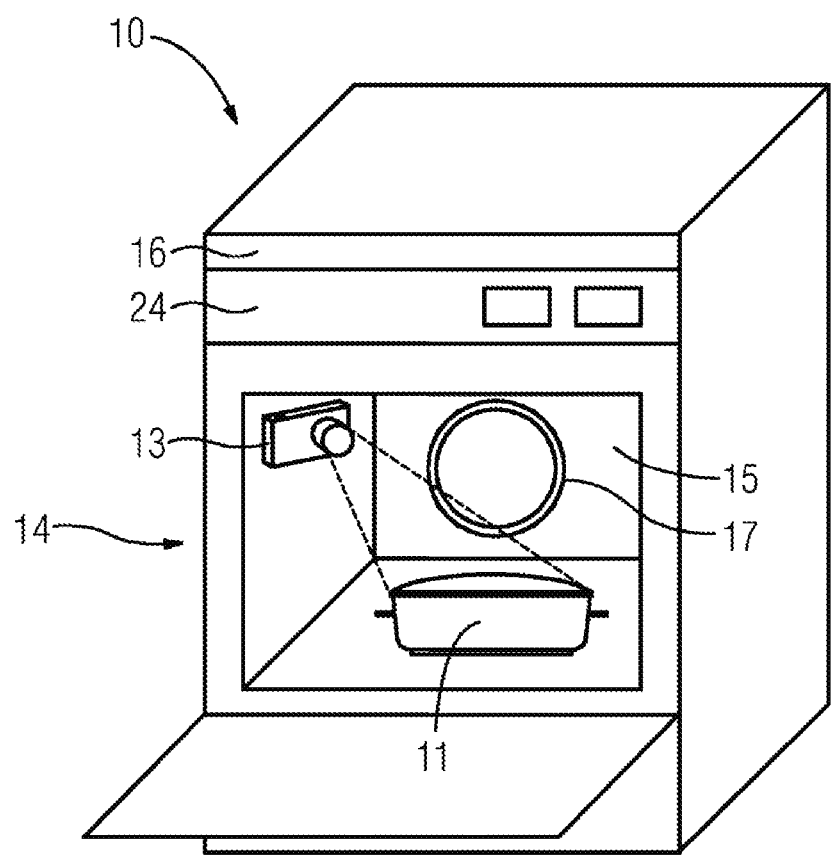
Figure 3:
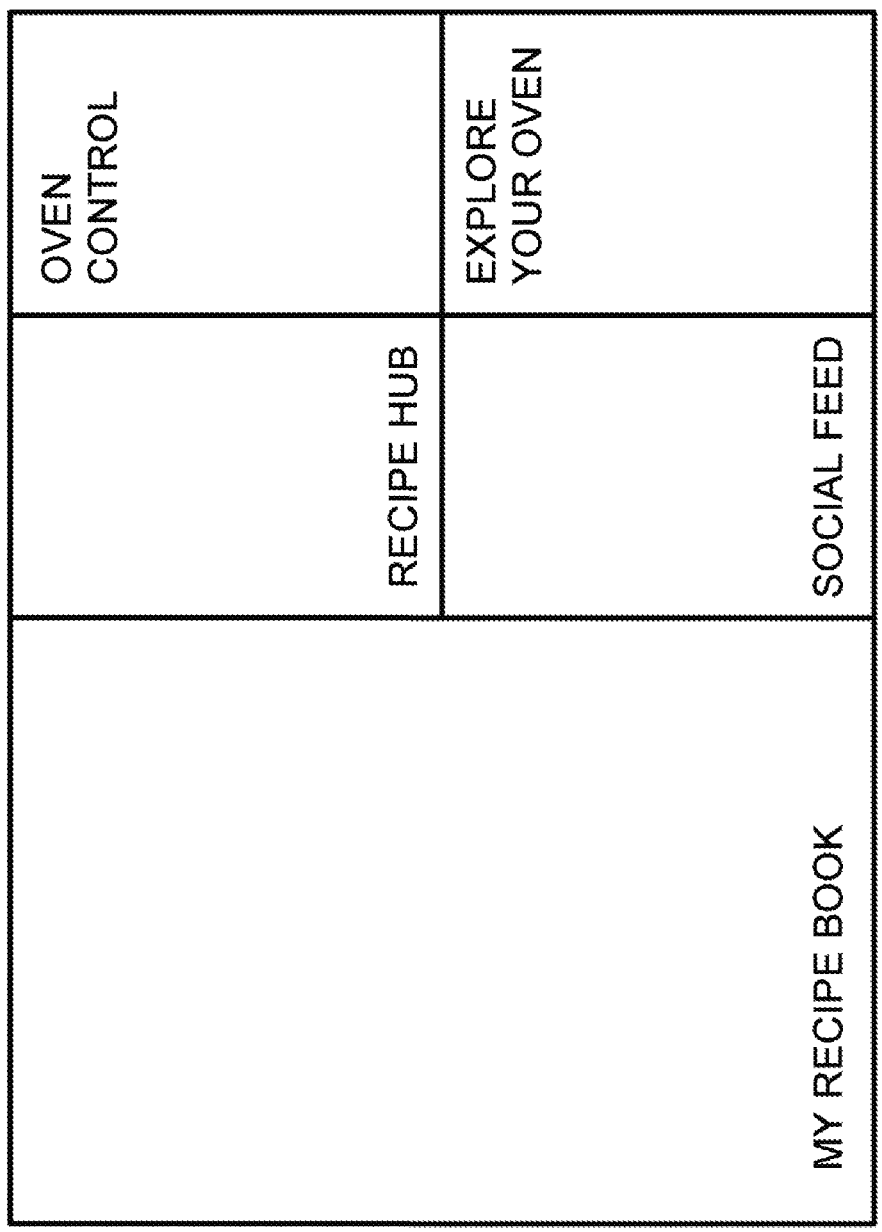
Figure 4:
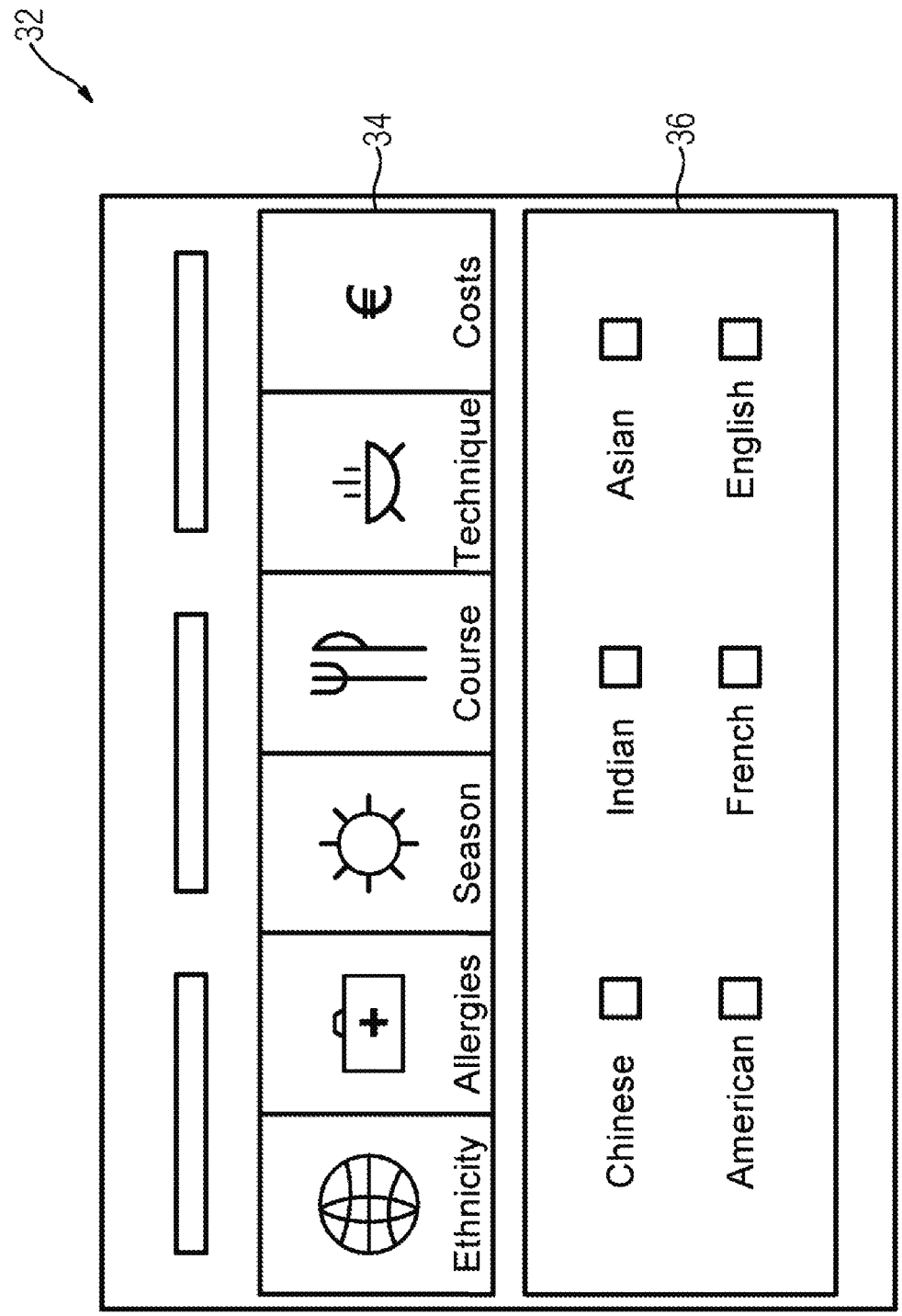
Figure 5:

The present invention will be described in further detail with reference to the drawings, in which FIG. 1 illustrates a schematic view of a domestic appliance and a mobile computer device according to a preferred embodiment of the present invention, FIG. 2 illustrates a schematic perspective view of the domestic appliance according to the preferred embodiment of the present invention, FIG. 3 illustrates a schematic view of an example for a main page of application software ("APP") for the mobile computer device according to the preferred embodiment of the present invention, FIG. 4 illustrates a schematic view of an example for a page of a recipe generator of the application software ("APP") for the mobile computer device according to the preferred embodiment of the present invention, and FIG. 5 illustrates a schematic view of an example for a page of a multi-timer function of the application software ("APP") for the mobile computer device according to the preferred embodiment of the present invention.

Figure 6:
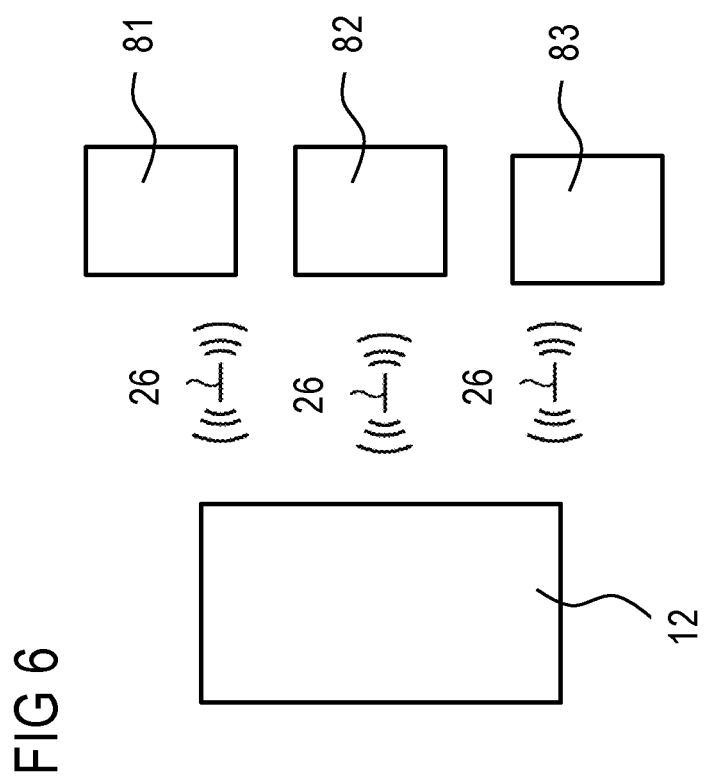
Figure 7:
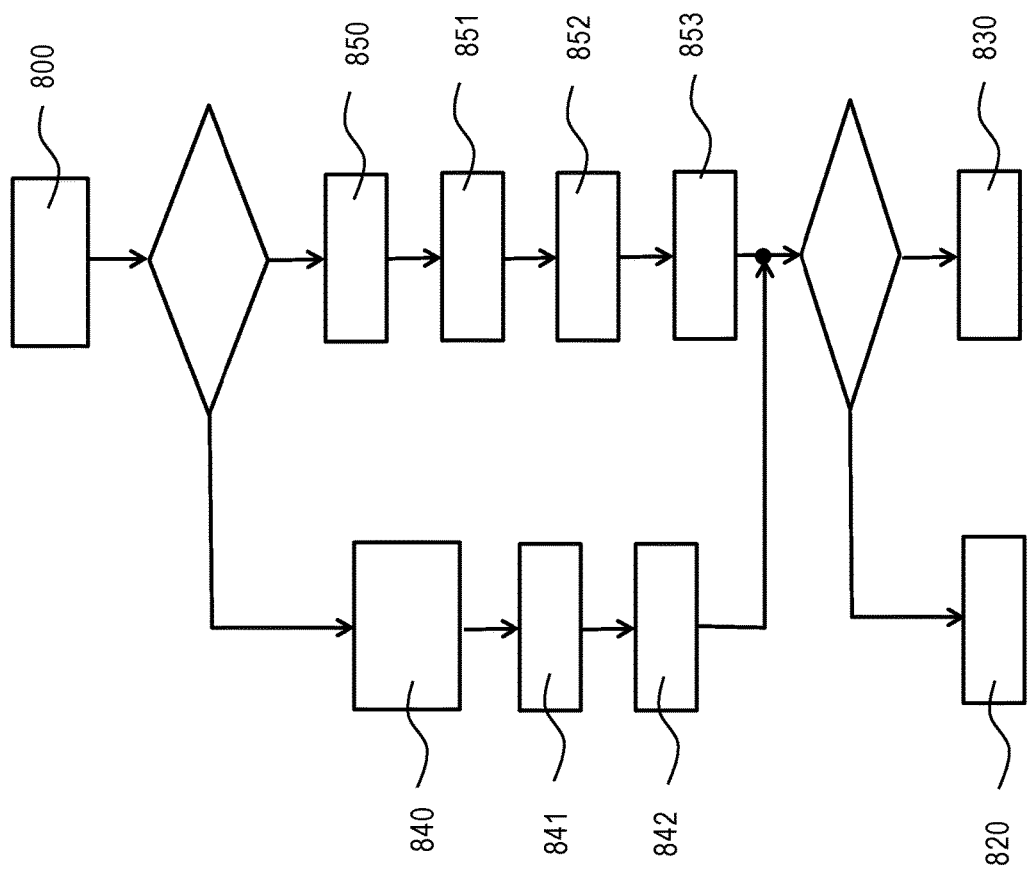

FIG. 6 illustrates a schematic view of an example for a mobile computer device and computers according to a preferred embodiment of the present invention and FIG. 7 illustrates a flow diagram according to a preferred embodiment of the present invention.

FIG. 1 illustrates a schematic view of a domestic appliance 10 and a mobile computer device 12 according to a preferred embodiment of the present invention. In this example, the domestic appliance is a cooking appliance 10 including a cooking oven 14 and a cooking hob 16, wherein the cooking hob 16 is arranged above the cooking oven 14. Alternatively, the cooking appliance 10 may only include either the cooking oven 14 or the cooking hob 16. In this example, the domestic appliance 10 or the cooking appliance 10, respectively, includes a stationary control unit 24. In general, the domestic appliance 10 may be an arbitrary appliance, which is monitored and/or controlled by the user via the mobile computer device 12.

Further, the cooking device 10 may comprise one or more cameras not shown in FIG. 1. For example, the camera is arranged in or in front of an oven cavity of the cooking oven 14, so that food stuff inside the oven cavity may be monitored by the user. Further, the camera may be arranged above the cooking hob 16, so that food stuff on said cooking hob 16 may be monitored by the user. In the latter case, the camera may be attached at an exhaust hood arranged above the cooking hob 16.

Moreover, the cooking device 10 may comprise at least one temperature sensor for detecting the temperature of the food stuff and/or in the oven cavity and/or in a cooking pot.

The mobile computer device 12 includes a display 18 or a touch screen 18. Further, the mobile computer device 12 includes a keyboard 20. The display 18 forms an output unit of the mobile computer device 12. The keyboard 20 forms an input unit of the mobile computer device 12. The touch screen 18 forms an input/output unit of the mobile computer device 12. If the display 18 is formed as the touch screen 18, then the mobile computer device 12 does not need necessarily the keyboard 20.

The mobile computer device 12 may be a customary device. For example, the mobile computer device 12 may be a mobile phone, a smart phone, a tablet personal computer, a netbook or a notebook.

There is a wireless data connection 22 between the cooking appliance 10 and the mobile computer device 12. According to one embodiment said wireless data connection 22 is unidirectional, wherein signals may be transferred only from the domestic appliance 10 to the mobile computer device 12. In this case, the user is able to monitor a working process of the cooking appliance 10 by the mobile computer device 12. According to another embodiment the wireless data connection 22 is bidirectional, wherein signals may be transferred from the domestic appliance 10 to the mobile computer device 12 as well as from the mobile computer device 12 to the domestic appliance 10. In the latter case, the user is able to control the working process of the cooking appliance 10 by the mobile computer device 12. If the wireless data connection 22 between the cooking appliance 10 and the mobile computer device 12 is unidirectional, then the user may control the domestic appliance 10 by the stationary control unit 24 of the domestic appliance 10. If the wireless data connection 22 between the cooking appliance 10 and the mobile computer device 12 is bidirectional, then the user may control the domestic appliance 10 by the mobile computer device 12 and/or the stationary control unit 24.

The cooking appliance 10 and the mobile computer device 12 may be interconnected or interconnectable via the internet. For example, the cooking appliance 10 is connected or connectable to the internet via a local area network (LAN) or a wireless local area network (WLAN) to the internet. The mobile computer device 12 may be connected or connectable to the internet via a wireless local area network (WLAN) or a mobile communications network.

Alternatively, the wireless data connection 22 between the cooking appliance 10 and the mobile computer device 12 may be realized via a radio contact. Further, the cooking appliance 10 and the mobile computer device 12 may be interconnected or interconnectable via infrared signals. In general, an arbitrary wireless data connection 22 between the cooking appliance 10 and the mobile computer device 12 is possible. Preferably, the selection of the type of the wireless data connection 22 between the cooking appliance 10 and the mobile computer device 12 depends on the favoured operating distance.

The display 18 and/or the touch screen 18 of the mobile computer device 12 are provided for indicating current pictures recorded by the camera of the cooking device 10. The wireless data connection 22 from the cooking appliance 10 to the mobile computer device 12 is provided for transferring picture signals in real time.

In a similar way, the display 18 and/or the touch screen 18 of the mobile computer device 12 are provided for indicating current temperature values detected by the temperature sensor of the cooking device 10. The wireless data connection 22 from the cooking appliance 10 to the mobile computer device 12 is provided for transferring temperature signals in real time.

Optionally, there is an external connection 26 between the mobile computer device 12 and the internet 28. Preferably, the mobile computer device 12 is connected to the internet 28 via the wireless local area network (WLAN) or the mobile communications network. The external connection 26 allows communications between the mobile computer device 12 and the internet 28. For example, the mobile computer device 12 may use applications provided by the internet 28. Further, the user is able to download software for the mobile computer device 12 from the internet 28. Moreover, the user can access to data bases in the internet 28 by the mobile computer device 12.

All in all there are four possible different constellations in view of the wireless data connection 22 and the external connection 26. According to a first constellation the wireless data connection 22 is unidirectional from the cooking appliance 10 to the mobile computer device 12, wherein the external connection 26 lacks. According to a second constellation the wireless data connection 22 is bidirectional between the cooking appliance 10 and the mobile computer device 12, wherein the external connection 26 lacks. According to a third constellation the wireless data connection 22 is unidirectional from the cooking appliance 10 to the mobile computer device 12, wherein the external connection 26 exists between the mobile computer device 12 and the internet 28. According to a fourth constellation the wireless data connection 22 is bidirectional between the cooking appliance 10 and the mobile computer device 12, wherein the external connection 26 exists between the mobile computer device 12 and the internet 28. In the first and second constellations the wireless data connection 22 between the cooking appliance 10 and the mobile computer device 12 may be realized via the internet, although the external connection 26 between the mobile computer device 12 and the internet 28 lacks.

FIG. 2 illustrates a schematic perspective view of the domestic appliance 10 according to the preferred embodiment of the present invention, wherein the domestic appliance is the cooking appliance 10. Said cooking appliance 10 includes the cooking oven 14 with an oven cavity 15 and the cooking hob 16, wherein the cooking hob 16 is arranged above the cooking oven 14.

Food stuff 11 being treated by the cooking appliance 10 is arranged inside the oven cavity 15. A heating element 17 is arranged at a rear wall of the oven cavity 15. The cooking appliance 10 comprises a camera 13. Said camera 13 is provided for detecting visually the food stuff 11 being treated by the cooking appliance 10. The camera 13 provides a picture signal of said food stuff 11. The camera 13 may be arranged in or in front of the oven cavity 15 of the cooking oven 14, so that the food stuff 11 inside the oven cavity 15 may be monitored by the user. Alternatively, the camera 13 may be arranged above the cooking hob 16, so that food stuff 11 on said cooking hob 16 may be monitored by the user. In the latter case, the camera 13 may be attached at an exhaust hood arranged above the cooking hob 16.

The present invention provides application software ("APP") for the mobile computer device 12. Said application software comprises one or more functions and/or features supporting the operations of the mobile computer device 12. Several functions and features of the application software are described below.

FIG. 2 illustrates a schematic view of an example for a main page 30 of application software ("APP") for the mobile computer device according to the preferred embodiment of the present invention. Said main page 30 may be indicated by the display 18 or touch screen 18. In this example, the area of the main page 30 is subdivided into five subareas. The area of the main page 30 represents a menu, while the five subareas represent a menu item in each case. In this embodiment, the menu items correspond with the functions "my recipe book", "recipe hub", "social feed", "oven control" and "explore your oven".

The function "my recipe book" allows the generation and administration of an individual recipe book by the user. Said individual recipe book may be generated on the basis of a recipe book provided by the manufacturer of the cooking appliance 10, mobile computer device 12 and/or application software. Recipes generated by the user may be inserted into the function "my recipe book".

The function "recipe hub" allows the selection of recipes from a data base. The user may input a number of criteria for the desired recipe. The function "social feed" allows the access to a social network, cooking sites and/or cooking blogs. The function "explore your oven" allows an access to manuals in order to obtain satisfactory results.

The function "oven control" allows an adjusting of cooking parameters for the cooking appliance 10 by the mobile computer device 12. The function "oven control" requires the bidirectional wireless connection 22 between the cooking appliance 10 and the mobile computer device 12.

According to one embodiment, the application software ("APP") comprises a viewing function. Said viewing function allows the representation of a picture signal from the camera 13 of the cooking appliance 10 on the display 18 or touch screen 18 of the mobile computer device 12. The viewing function allows a current viewing of the food stuff 11 in the oven cavity 15 of the cooking oven 14 and/or on the cooking hob 16 on the display 18 or touch screen 18 of the mobile computer device 12. A real-time transmission of pictures from the camera 13 of the cooking appliance 10 to the display of the mobile computer device 12 is possible. Thus, the user is able to monitor the food stuff 11 in the oven cavity 15 of the cooking oven 14 and/or on the cooking hob 16 of the cooking appliance 10 from a distance by the mobile computer device 12. The user is always able to inform about the current state of the food stuff 11 in or on the cooking appliance 10.

If the wireless connection 22 between the cooking appliance 10 and the mobile computer device 12 is unidirectional, wherein the picture signals are transferred from the domestic appliance 10 to the mobile computer device 12, then the user is able to monitor the cooking process of the cooking appliance 10 by watching the picture or pictures of the food stuff 11 on the display 18 or touch screen 18 of the mobile computer device 12. In this case, the user can control the cooking process by the stationary control unit 24 of the cooking appliance 10. The unidirectional wireless connection 22 between the cooking appliance 10 and the mobile computer device 12 has the advantage that the cooking process of the cooking appliance 10 cannot be disturbed by external signals.

If the wireless connection 22 between the cooking appliance 10 and the mobile computer device 12 is bidirectional, wherein the picture signals are transferred from the domestic appliance 10 to the mobile computer device 12 and control signals are transferred from the mobile computer device 12 to the domestic appliance 10, then the user is able to control the working process of the cooking appliance 10 by handling the mobile computer device 12. The bidirectional wireless connection 22 between the cooking appliance 10 and the mobile computer device 12 has the advantage that the user can control the cooking process of the cooking appliance 10 from a relative big distance.

According to another embodiment, the application software ("APP") comprises a recipe generator. The recipe generator generates a proposal for one or more recipes. After the user has input or selected one or more search criteria for the favoured cooking recipe, then the recipe generator provides one or more corresponding proposals for at least one cooking recipe from a data base. Said data base may be stored in a memory of the mobile computer device 12 or provided by the internet.

For example, the recipe generator provided by the application software ("APP") comprises the following steps. In a first step the user inputs directly an ingredient of the favoured recipe. For example, the user selects a kind of meat, e.g. "beef", "pork", "duck" or "chicken", from a menu "meat" or kind of vegetable from a menu "vegetables". Further examples selectable by the user are "casserole", "soup", "dessert", "bread", "cake" and/or "cookies".

In a second step the user may select further search criteria by menu items. FIG. 3 illustrates a schematic view of an example for a page 32 of the recipe generator of the application software ("APP") for the mobile computer device 12 according to the preferred embodiment of the present invention. Said page 32 comprises an upper menu 34 and a lower menu 36.

In the this example, the upper menu 34 comprises the menu items "ethnicity", "allergies", "season", "course", "technique" and "costs". The menu items of the lower menu 36 depend on the selection in the upper menu 34. If the user has selected the menu item "ethnicity" in the upper menu 34 for example, then the user can further select between the menu items "American", "Chinese", "French", "Indian", "Asian", "English" and they like in the lower menu 36. The selection of the menu item "allergies" may provide a table of typical food allergies. The selection of the menu item "season" may relate to culinary seasons. The selection of the menu item "course" allows the selection of the number of courses of the menu. The selection of the menu item "technique" provides a selection of the technical method of the cooking process, e.g. top heat, bottom heat, top and bottom heat, circulating air, full steam, half steam plus heat, quarter steam plus heat, grill and/or low temperature cooking.

In a next step, the recipes found by the application software are indicated on the display 18 or touch screen 18 of the mobile computer device 12, so that the user may select one of the found recipes. The parameters of the corresponding cooking process are adjusted automatically. At last, the user may activate a start function of the cooking process by operating the keyboard 20 or touch screen 18.

Additionally, the application software ("APP") allows food pairing, wherein the main ingredients and/or main aromas of a dish are determined and groups of main ingredients and/or main aromas harmonizing with each other are defined. Said food pairing comprises the following steps.

After selecting a first dish and the function "food pairing" by the user, predefined further dishes are proposed by the application software ("APP"), wherein said further dishes harmonize with the first dish in view of the ingredients and/or aromas. Optionally, the user may restrict the further dishes by selecting "next course", "prior course", "side dish" or "main dish".

Furthermore, the function "food pairing" may be supported by a database including dishes and/or courses, wherein the main ingredients and/or main aromas of said dishes and/or courses harmonize with each other.

According to a further embodiment, the application software ("APP") comprises a function "shopping list". The function "shopping list" may be activated by the user and generates a list of ingredients required for the selected dish or dishes. The generated shopping list may be edited by the user. For example, the shopping list may by printed in hardcopy form and/or used for an online order.

According to another embodiment, the application software ("APP") comprises a recipe converter. Said recipe converter allows an automatic conversion and indication of the cooking time and/or the temperature from one heating method to another, for example from a conventional heating method, e.g. top and bottom heat or circulating air, to a steam heating method.

Further, the application software ("APP") may comprise a recipe recognition function. Said recipe recognition function allows the identification of signs, i.e. numbers and/or letters, in recipe data bases of different origins. For example, the recipe recognition function is able to recognize signs in a text file, e.g. PDF file, made of scanned-in hand-written documents. The recipe recognition function is provided for recognizing the ingredients, their amounts, the cooking time, the cooking temperature and/or the way of heating. Further, the recipe recognition function may provide proposals for alternative ways of heating. Optionally, the cooking parameters are converted for the alternative way of heating.

In particular, the application software ("APP") may comprise a communication basis for one or more social networks. For example, the communication basis is provided for exchanging experiences and information about the recipes. There are several social networks providing a forum for themes related to cooking. Some social networks provide recipes, which may be directly or indirectly integrated into the application software ("APP") or a corresponding data base.

According to another embodiment, the application software ("APP") comprises a parameter display function for indicating information about the oven parameters. In particular, the parameter display function indicates the current way of heating, the current temperature, the elapsed time and the remaining time. Further, the parameter display function may provide indications for necessary activities of the cooking process. Preferably, a warning before the end of the cooking duration may be indicated, for example ten minutes before the end of the cooking time. Furthermore, a warning may be indicated in order to turn-over the food stuff 11, for example roast or poultry, by the user. Also, a warning for filling up a water tank for a steam cooker may be indicated.

According to a further embodiment, the application software ("APP") comprises a multi-timer function. Said multi-timer function is applicable to a cooking process, wherein different dishes and/or courses are prepared simultaneously at the same temperature, in particular in the same oven cavity 15 of the cooking oven 14. The different dishes and/or courses are cooked at the same temperature, but with diverse cooking durations. The cooking process is performed at relative low temperatures. The multi-timer function of the application software provides a separate timer for each dish or course. For example, the user may adjust the timer directly for the single dishes and/or courses. Then, the elapsed times and/or remaining times are indicated.

Optionally, a warning signal is indicated before the end of the cooking duration. If the different dishes and/or courses shall be finished at the same time, then they have to be inserted into the oven cavity 15 at different times. In this case, a warning signal may be indicated at the points in time, when the single dishes and/or courses should be inserted into the oven cavity 15.

FIG. 4 illustrates a schematic view of an example for a page 40 of the multi-timer function of the application software ("APP") for the mobile computer device 12 according to the preferred embodiment of the present invention. The page of the multi-timer function may be represented by the display 18 or touch screen 18 of the mobile computer device 12. In this example, the page 40 of the multi-timer function indicates remaining cooking times for three different dishes and/or courses prepared in the same oven cavity 15 at the same temperature. The area of the page 40 is subdivided into three subareas 42, 44 and 46. Each subarea 42, 44 and 46 indicates the remaining cooking time and the name of the corresponding dish or course. In this example, a first subarea 42 indicates the dish "Pink French Lamb" and its remaining cooking time, a second subarea 44 indicates the dish "Chocolate Roulade" and its remaining cooking time, and a third subarea 46 indicates the course "Asparagus Terrine" and its remaining cooking time.

FIG. 6 illustrates a schematic view of an example for a mobile computer device 10 and computers 81, 82 and 83 according to the present invention.

The first mobile computer device 12 is interconnected or interconnectable via a second data connection with a first stationary computer 81.

The first stationary computer 81 is especially a data server. The second data connection to the first stationary computer 81 is preferably using an internet connection.

The mobile computer device 12 is interconnected or interconnectable also with a second stationary computer 82, wherein the second stationary computer is especially a license server.

The mobile computer device 12 sends an request with request data especially user identification data and/or access permission data, to the second stationary computer 82 in order to receive configuration data for establishing the connection with the first stationary computer.

The configuration data is submitted from the second stationary computer when the request data can be identified as valid request data by data on the storage system of the second stationary computer.

FIG. 7 illustrates a flow diagram according to the present invention.

In a first interacting state 800 no data interaction with the first stationary computer 81 is enabled.

In a first request state 840, the mobile computer device 12 has valid request data on its storage system for the request so that the request data can be identified as valid request data by data on the second stationary computer.

In a second request state 850, the mobile computer device 12 has no valid request data on its storage system for the request so that the request cannot be identified as valid request data by data on the second stationary computer. The second stationary computer is especially a license server.

In the first request state 840, the mobile computer device 12 transmits user identification data to the second stationary computer 82 as step 841.

The second stationary computer 82 transmits configuration data for establishing the connection with the first stationary computer as step 842, so that the mobile computer device 12 can be switched from the first interacting state to the second interacting state 820 or third interacting state 820 with the first stationary computer 81.

In the second request state 850, the mobile computer device 12 requests data input, especially registration information from the user, from an input device.

As a next step 851, data input, especially registration information, is inputted by the user into the mobile computer device 12.

The registration information from the user is transmitted in step 852 to the second stationary computer 82 by the mobile computer device 12.

The second stationary computer 82 transmits configuration data for establishing the connection with the first stationary computer in step 853, so that the mobile computer device 12 is switched from the first interacting state to the second interacting state 820 or third interacting state 830 with the first stationary computer 81.

In the second interacting state 820 interaction with the first stationary computer 81 is enabled.

In a third interacting state 830, extended interaction with the first stationary computer 81 is enabled. In the third interacting state, extended rights, especially extended warranties, are permitted by the first stationary computer.

In the second interacting state 820, items can be selected on the mobile computer device 12 from a list, especially from a recipe list. The recipe list is displayed on the display 18 of the mobile computer device 12.

Furthermore, in the second interacting state 820, the mobile computer device 12 can transfer a first data packet with the selected items as well as second data packet with the information about the appliance to the first stationary computer 81.

The first stationary computer 81, especially a web shop or online shop, provides a third data packet, preferably a list of products, more preferably of compatible and preferred products.

The mobile computer device 12 can transfer a fourth data packet, especially with order information for the selected items, to the first stationary computer 81.

Furthermore, in the second interacting state 820, the mobile computer device 12 can transfer appliance information to the first stationary computer 81.

Next, in the second interacting state 820, the mobile computer device 12 can transfer a data packet with a support request to the first stationary computer. The first stationary computer 81 then provides support and/or error handling information.

Furthermore, in the second interacting state, the mobile computer device 12 can transfer appliance information to the first stationary computer 81.

Next, in the second interacting state, the mobile computer device 12 can transfer a data packet with support request to the first stationary computer. The first server 81 then retrieves timing information for technicians from a database.

After that, the first stationary computer 81 selects possible service times. The first stationary computer 81 then provides timing information for booking a technician.

In the second interacting state the mobile computer device 12 can also transfer a cooking class request to the first stationary computer 81.

The first stationary computer or server 83 retrieves timing information for cooking class from a database. The first stationary computer 81 then selects possible cooking class times, wherein the first server 81 provides timing information for booking a cooking classes.

In the second interacting state 820, the mobile computer device 12 can also transfer a message and/or an image or a video sequence to the third stationary computer 83.

The third server 83 saves the message and/or the image or the video sequence in a database, wherein the third server transfers the message and/or the image or the video sequence to at least one client computer.

According to another embodiment, the application software ("APP") comprises an "intuitive display function" for indicating the status of the cooking process. For example, in the beginning of the cooking process the background of the display 18 or touch screen 18 or an indicating portion of said display 18 or touch screen 18 is dark. Then a relative small bright area on the display 18 or touch screen 18 or the indicating portion of said display 18 or touch screen 18, respectively, is activated. During the advancing cooking process the bright area becomes bigger. In the end of the cooking process the whole area of the display 18 or touch screen 18 or of the indicating portion of said display 18 or touch screen 18, respectively, becomes bright. Preferably, the bright area is enhanced from left to right. In particular, a characteristic colour for the area becoming brighter is used. The "intuitive display function" allows that the status of the cooking process may be recognized clearly and from a relative big distance.

According to a further embodiment, the application software ("APP") comprises a cooking time reduction function and/or a temperature reduction function. In this case, said cooking time reduction function and temperature reduction function require the bidirectional wireless connection 22 between the cooking appliance 10 and the mobile computer device 12, so that the cooking appliance 10 is controllable by the mobile computer device 12. The user may reduce the cooking time and/or the temperature wirelessly via the mobile computer device 12. There is no doubt about the safety, since the energy supply is reduced. In contrast, there is doubt about the safety, if the cooking time and/or the temperature increase, since very high electric power is operated by remote control.

According to another embodiment, the application software ("APP") comprises a cooking time adjusting function and/or a temperature adjusting function, wherein an increasing of the cooking time and/or the temperature is allowed. For safety reasons the cooking time and/or the temperature may be increased by a slider, which can be activated only by two fingers at the same time. This reduces the danger of an inadvertent activation of said slider.

According to a further embodiment, the application software ("APP") comprises a display function of statistic parameters. For example, the energy consumption of the cooking appliance may be indicated in relation to other parameters. The energy consumption for predetermined time periods may be indicated graphically or by a table. The energy consumption may be indicated in dependence of the types of food stuff 11 of recipes.

According to another embodiment, the application software ("APP") comprises an edit function. The user may input and store an own cooking recipe for his own purposes. Further, the user may present own cooking recipes in a social network, wherein photographs of the user and/or food stuff 11 may be inserted.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 domestic appliance, cooking appliance
11 object, food stuff
12 mobile computer device
13 camera
14 cooking oven
15 oven cavity
16 cooking hob
17 heating element
18 display, touch screen
20 keyboard
22 wireless data connection
24 stationary control unit
26 external connection
28 internet
30 main page of application software
32 page of recipe generator
34 upper menu
36 lower menu
40 page of multi-timer function
42 first subarea, timer
44 second subarea, timer
46 third subarea, timer
81 first stationary computer
82 second stationary computer
83 third stationary computer
212 second mobile computer device
800 first interacting state
820 second interacting state
830 third interacting state
840 first request state
841, 842 request states
850 second request state
851-853 request states

The invention claimed is:

1. Method for data communication with a domestic appliance (10) by a mobile computer device (12), wherein the domestic appliance (10) and the mobile computer device (12) are interconnected or interconnectable via a wireless data connection (22) that is adapted for transferring signals between the domestic appliance (10) and the mobile computer device (12),
   wherein the mobile computer device is interconnected or interconnectable via a second data connection with a first stationary computer, wherein the first stationary computer is a data server, and the mobile computer device is also interconnected or interconnectable with a second stationary computer, wherein the second stationary computer is a license server; and
   wherein the mobile computer device sends a request with request data, user identification data and/or access permission data, to the second stationary computer in order to receive configuration data for establishing the connection with the first stationary computer.

2. The method according to claim 1,
wherein the second data connection to the first stationary computer (81) is an internet connection.

3. The method according to claim 1,
wherein the configuration data is submitted from the second stationary computer when the request data can be identified as valid request data by data on the storage system of the second stationary computer.

4. The method according to claim 1,
wherein in a first request state (840), the mobile computer device (12) has valid request data on its storage system for the request so that the request data can be identified as valid request data by data on the second stationary computer (82),
wherein in a second request state (850), the mobile computer device (12) has no valid request data on its storage system for the request so that the request cannot be identified as valid request data by data on the second stationary computer (82),
wherein the second stationary computer is a license server.

5. The method according to claim 1,
wherein in a first interacting state (800) no data interaction with the first stationary computer (81) is enabled,
wherein in a second interacting state (830), data interaction with the first stationary computer (81) is enabled.

6. The method according to claim 1,
wherein in the first request state (840), the mobile computer device (12) transmits user identification data to the second stationary computer (82),
wherein the second stationary computer (82) transmits configuration data for establishing the connection with the first stationary computer (81),
so that the mobile computer device (12) is switched from the first interacting state (800) to the second interacting state (820) with the first stationary computer (81).

7. The method according to claim 1,
wherein in the second request state (850) the mobile computer device (12) requests registration information, from the user, from an input device,
wherein, as a next step, registration information, is inputted by the user into the mobile computer device (12),
wherein the registration information from the user is transmitted to the second stationary computer (82) by the mobile computer device (12),
wherein the second stationary computer (82) transmits configuration data for establishing the connection with the first stationary computer,
so that the mobile computer device (12) is switched from the first interacting state to the second interacting state (820) with the first stationary computer (81).

8. The method according to claim 1,
wherein in a third interacting state (830), extended interaction with the first stationary computer (81) is enabled.

9. The method according to claim 1,
wherein in the third interacting state (830), extended rights are permitted by the first stationary computer (81).

10. The method according to claim 1,
wherein items can be selected from a list wherein the recipe list is displayed on the display (18) of the mobile computer device (12)

wherein in the second interacting state, the mobile computer device (12) transfers a first data packet with the selected items as well as second data packet with the information about the appliance to the first stationary computer (81), wherein the first stationary computer (81) provides a third data packet including a list of products, wherein the mobile computer device (12) can transfer a fourth data packet to the first stationary computer (81), with order information for the selected items, to the second stationary computer.

11. The method according to claim 1,
wherein in the second interacting state (820) the mobile computer device (12) can transfer appliance information to the first stationary computer (81), wherein in the first interacting state (820) the mobile computer device (12) can transfer a data packet with a support request to the first stationary computer 81), wherein the first stationary computer (81) provides support and/or error handling information.

12. The method according to claim 1,
wherein in the second interacting state (820) the mobile computer device (12) can transfer appliance information to the first stationary computer (81), wherein in the second interacting state (820) the mobile computer device (12) can transfer a data packet with support request to the first stationary computer (81), wherein the first stationary computer (81) retrieves timing information for technicians from a database, wherein the first stationary computer (81) selects possible service times for technicians, wherein the first stationary computer (81) provides timing information for booking a technician.

13. The method according to claim 1,
wherein in the second interacting state (820) the mobile computer device (12) can transfer a cooking class request to the first stationary computer (81)

wherein the first stationary computer (81) retrieves timing information for cooking class from a database, wherein the first stationary computer selects possible cooking class times, wherein the first stationary computer (81) provides timing information for booking a cooking class.

14. The method according to claim 1,
wherein in the second interacting state (820), the mobile computer device (12) can transfer a message and/or an image or a video sequence to a third stationary computer (83), wherein the third stationary computer saves the message and/or the image or the video sequence in a database, wherein the third stationary computer transfers the message and/or the image or the video sequence to a client computer.

15. The method according to claim 1, characterized in that the method comprises the steps of:
detecting visually at least one object (11) being treated by the domestic appliance (10), generating a picture signal of the object (11) being treated by the domestic appliance (10), transferring the picture signal from the domestic appliance (10) to the mobile computer device (12) via the wireless data connection (22), and displaying a picture of the object (11) being treated by the domestic appliance (10) on a display (18) or touch screen (18) of the mobile computer device (12) on the basis of the picture signal, so that the object (11) being treated by the domestic appliance (10) is represented or representable in real-time on the display (18) or touch screen (18) of the mobile computer device (12).

16. The method according to claim 1, characterized in that the domestic appliance (19) is a cooking appliance (10) including a cooking oven (14) and/or a cooking hob (16), said object (11) being treated by the domestic appliance (10) is a food stuff (11) being treated by the cooking appliance and said wireless data connection (22) is at least a unidirectional data connection (22) for transferring signals form the cooking appliance (10) to the mobile computer device (12) for allowing monitoring in real time by a user of the visual appearance of said food stuff (11) being treated by the cooking appliance (10) on the display (18) or touch-screen (18) of said mobile computer device (12).

17. The method according to claim 1,
characterized in that
at least one current operating parameter of the domestic appliance (10) is transferred between the domestic appliance (10) and the mobile computer device (12) via the wireless data connection (22), wherein said at least one current operating parameter of the domestic appliance (10) is indicated by the display (18) or touch screen (18) of the mobile computer device (12) and/or wherein said at least one current operating parameter of the domestic appliance (10) can be set by a user via said display (18) or touch screen (18) of the mobile computer device (12).

18. The method according to claim 17,
characterized in that
the at least one current operating parameter of the domestic appliance (10) is represented by a numerical value and/or by one or more graphical symbols on the display (18) or touch screen (18) of the mobile computer device (12).

19. The method according to claim 1,
characterized in that
the domestic appliance (10) is a cooking appliance (10), wherein the temperature of at least one food stuff (11) being treated by the cooking appliance (10) is detected by said cooking appliance (10), at least one corresponding temperature signal is transferred to the mobile computer device (12) via the wireless data connection (22) in real-time, and at least one corresponding temperature value is indicated by the mobile computer device (12).

20. The method according to claim 1,
characterized in that
the domestic appliance (10) is a cooking appliance (10), wherein an elapsed and/or a remaining cooking time of at least one food stuff (11) being treated by the cooking appliance (10) is transferred to the mobile computer device (12) via the wireless data connection (22) in real-time and indicated by the mobile computer device (12).

21. The method according to claim 1,
characterized in that
at least one operating parameter of the domestic appliance (10) is evaluated by the mobile computer device (12) and the obtained result is indicated on the display (18) or touch screen (18) of the mobile computer device (12), wherein said result includes a history and/or a statistical analysis of said at least one operating parameter of the domestic appliance (10) and/or further corresponding information relating to said history and/or statistical analysis.

22. The method according to claim 1, characterized in that
the mobile computer device (12) is connected or connectable to the internet via a wireless data connection, wherein the mobile computer device (12) is connected or connectable to at least one social network and/or to at least one data base.

23. The method according to claim 1, characterized in that
the wireless data connection (22) between the domestic appliance (10) and the mobile computer device (12) is a bidirectional connection transferring signals between the domestic appliance (10) and the mobile computer device (12), wherein the domestic appliance (10) is controlled or controllable by the user via the mobile computer device (12).

24. A non-transitory computer readable medium having an application software stored therein for a mobile computer device (12) connected or connectable to a domestic appliance (10) including a cooking oven (14) and/or a cooking hob (16), characterized in that
the application software is provided for causing the mobile computer device to perform the method according to a claim 1.

25. The non-transitory computer readable medium according to claim 24, characterized in that
the application software provides a recipe generator for a cooking appliance (10), wherein a user may input or select one or more search criteria for a cooking recipe and the recipe generator provides at least one corresponding proposal for a cooking recipe, and wherein a plurality of cooking recipes are stored in a memory of the mobile computer device (12) and/or in a data base of the internet.

26. The non-transitory computer readable medium according to claim 25, characterized in that
said one or more search criteria for a cooking recipe are selectable by the user from a group comprising at least one recipe food ingredient type, at least one recipe food ingredient amount, at least one cooking or baking temperature, at least one cooking or baking duration and/or at least one generic cooking mode such as radiation cooking, forced convection cooking, steam cooking, microwave cooking or induction cooking, and the application software comprises at least one algorithm for selecting said at least one corresponding proposal for a cooking recipe from said plurality of stored recipes on the basis of said selection by the user of at least one of said search criteria for a cooking recipe.

27. The non-transitory computer readable medium according to claim 25, characterized in that
it comprises an algorithm for adapting at least one recipe parameter of at least one of said plurality stored cooking recipes to an operational feature of the cooking appliance (10).

28. The non-transitory computer readable medium according to claim 27, characterized in that
said recipe parameter is at least one of said recipe food ingredient amount, cooking or baking temperature, cooking or baking duration, and/or generic cooking mode and/or wherein said operational feature of the cooking appliance (10) is a volume of an oven cavity (15) of the cooking appliance (10), a calorific output of at least one heating element (17) of the cooking appliance (10) and/or a calorific output of a cooking mode of the cooking appliance (10) such as a mode of the cooking appliance (10) for radiation cooking, for forced convection cooking, for steam cooking, for microwave cooking or for induction cooking.

29. The non-transitory computer readable medium according to claim 24, characterized in that
the application software comprises an algorithm for adapting at least one operational parameter of the cooking appliance (10) according to said at least one recipe parameter of the cooking recipe that has been selected by the user from said proposal by said recipe generator for a cooking recipe, wherein said at least one operational parameter of the cooking appliance (10) is a cooking or baking temperature, a cooking or baking duration and/or a mode of the cooking appliance (10) for radiation cooking, for forced convection cooking, for steam cooking, for microwave cooking or for induction cooking.

30. The non-transitory computer readable medium according to claim 24, characterized in that
the application software provides a multi-timer function for two or more dishes and/or courses in or on the cooking appliance (10), wherein said dishes and/or courses can be treated together in the same oven cavity (15) at the same temperature, but can require different cooking durations, and wherein the elapsed and/or remaining cooking durations of individual dishes and/or courses are indicated by the display (18) or touch screen (18) of the mobile computer device (12).

31. The non-transitory computer readable medium according to claim 24 characterized in that
the application software provides a cooking time reduction function and/or a cooking temperature reduction function, wherein a user may reduce the cooking time and/or the cooking temperature of the cooking appliance (10) by the mobile computer device (12) via the wireless data bidirectional connection between the domestic appliance (10) and the mobile computer device (12).

32. Domestic appliance (10) including a cooking oven (14) with an oven cavity (15) and/or a cooking hob (16), connected or connectable to a mobile computer device (12) via a wireless data connection (22), characterized in that
the domestic appliance (10) is provided for a method according to claim 1.

33. Domestic appliance (10) according to claim 32, wherein the domestic appliance (10) comprises at least one camera (13) arranged to detect visually and to provide a picture signal of said food stuff (11) being treated by said cooking appliance in said oven cavity (15) or on said cooking hob (16).

34. Mobile computer device (12) connected or connectable to a domestic appliance (10) via a wireless data connection (22), wherein the mobile computer device (12) comprises at least one display (18) and/or touchscreen (18), characterized in that the mobile computer device (12) is provided for a method according to claim 1.

35. Non-transitory computer-readable medium having stored thereon computer-executable instructions that, when executed, cause a computer to perform a method according to claim 1.

* * * * *